Oct. 12, 1948.    H. T. KRAFT    2,451,097
TIRE BEAD SPREADER
Filed Nov. 30, 1945    3 Sheets—Sheet 2
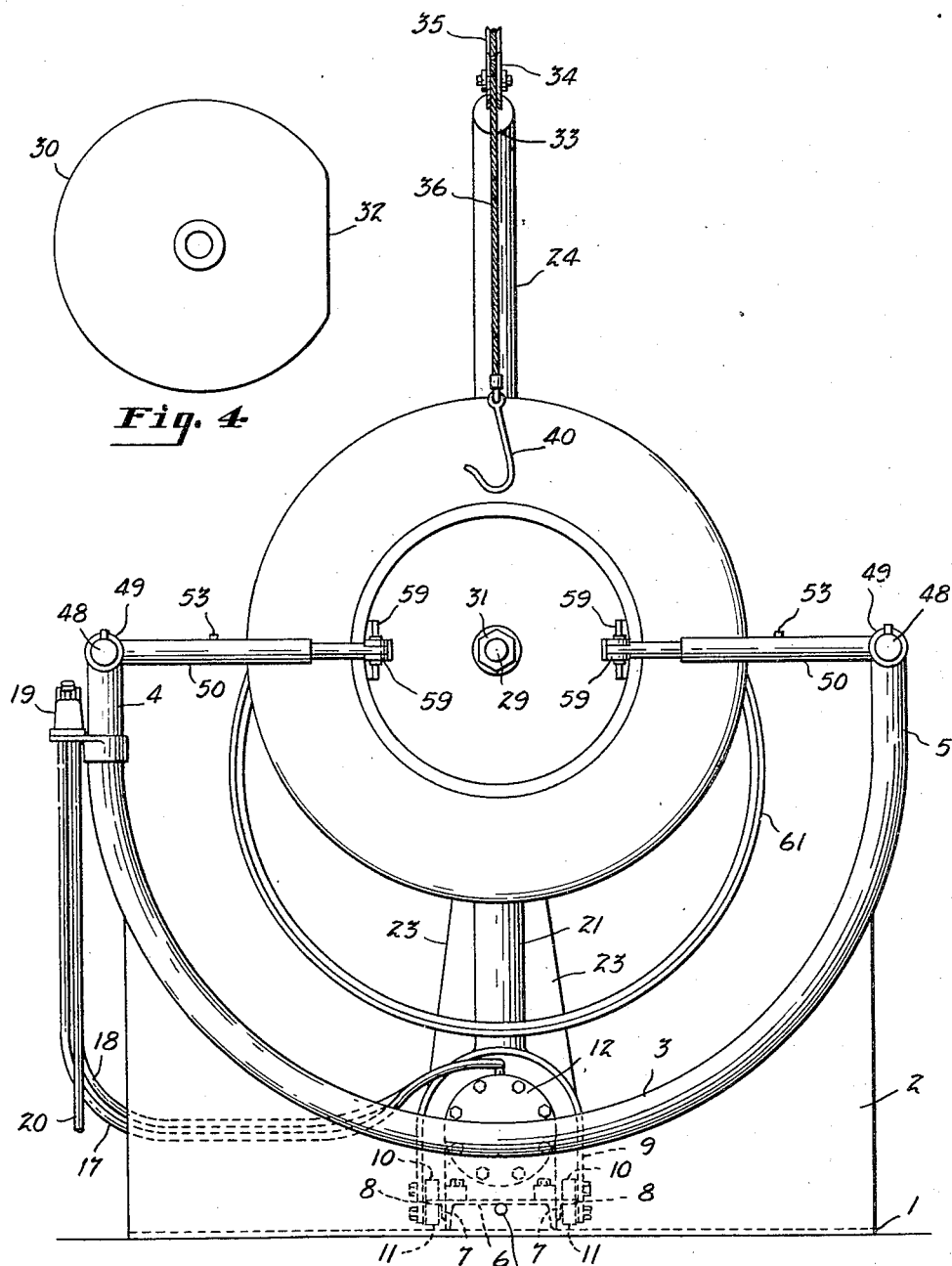
INVENTOR.
Herman T. Kraft
BY
Evans + McCoy
ATTORNEYS

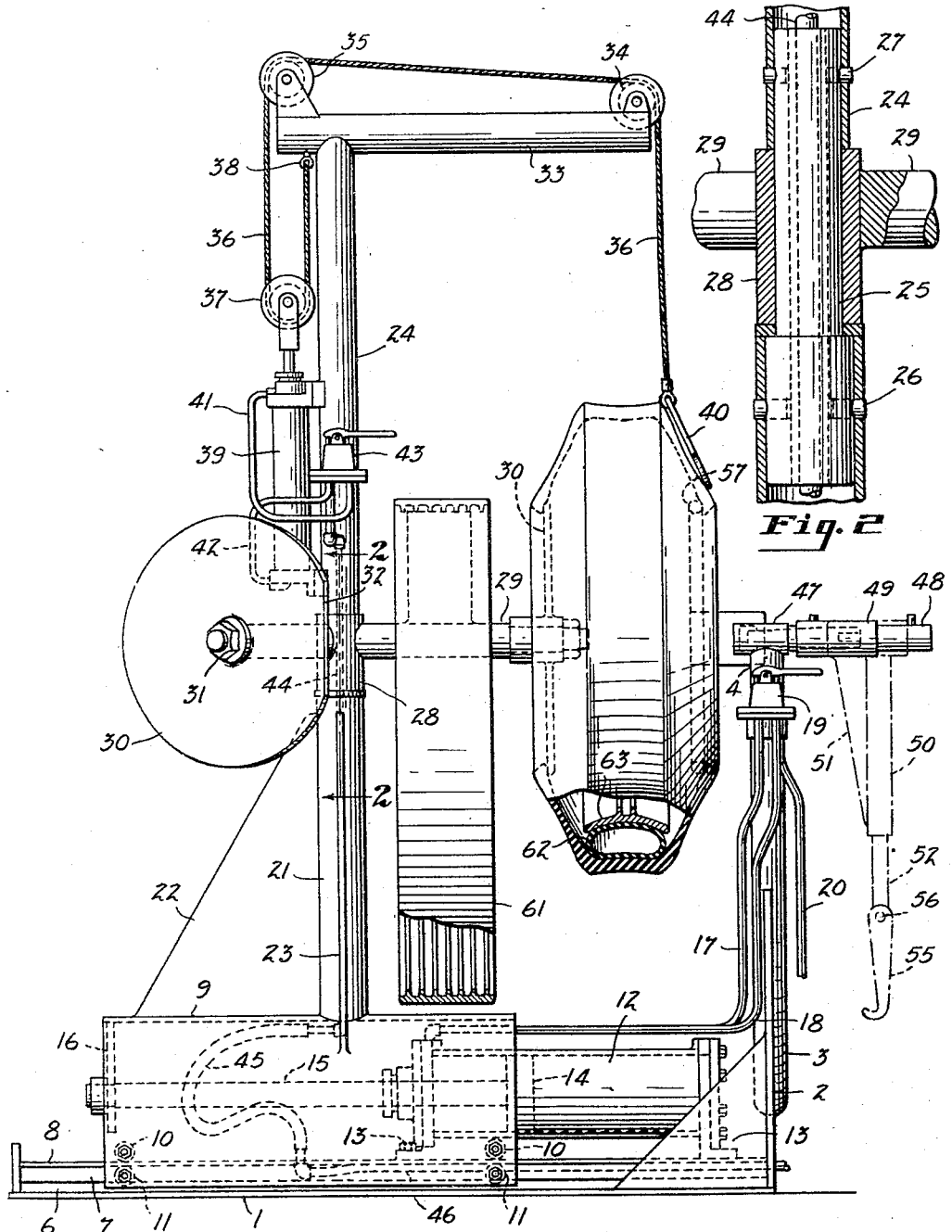

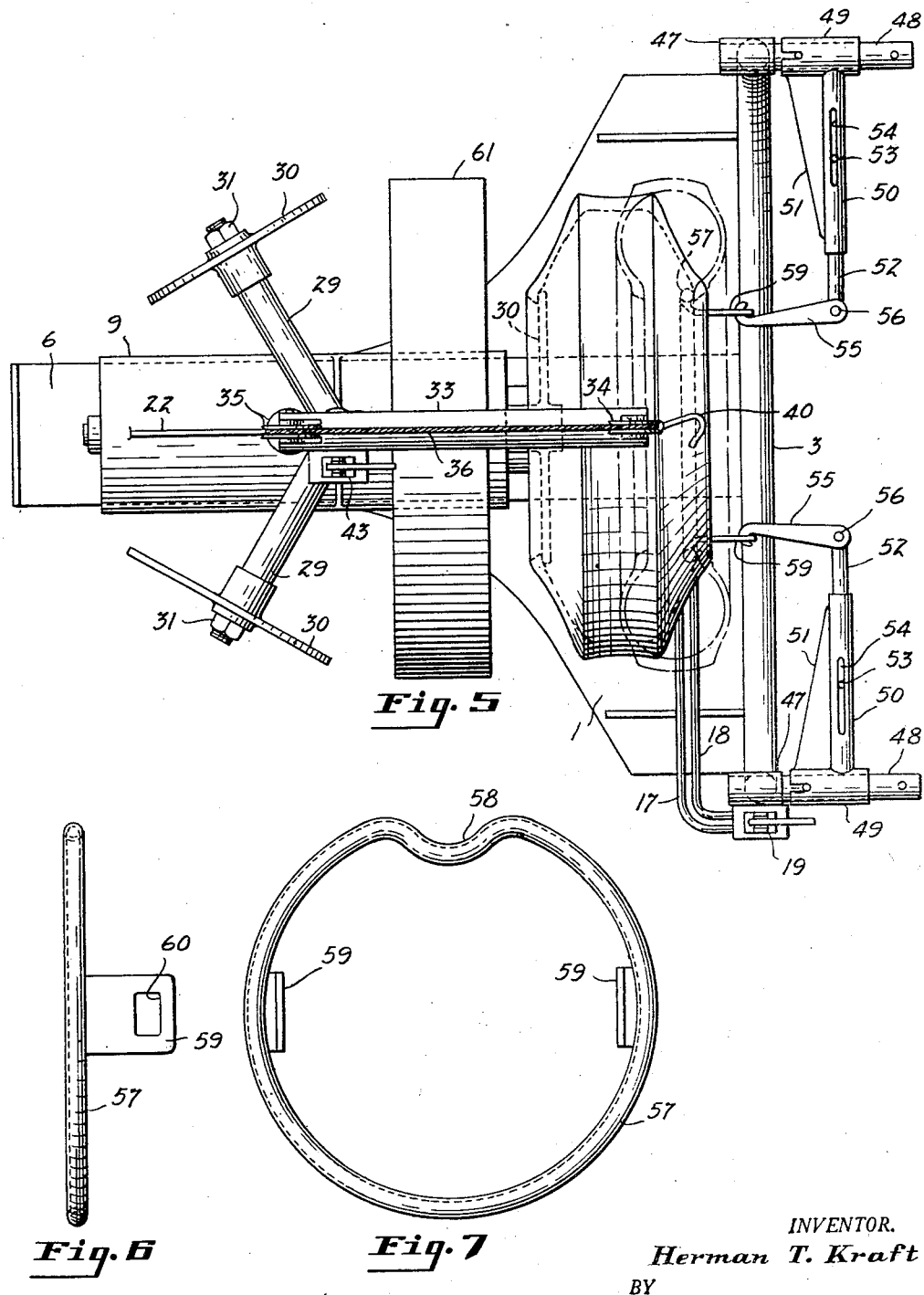

UNITED STATES PATENT OFFICE 2,451,097

TIRE BEAD SPREADER

Herman T. Kraft, Akron, Ohio, assignor to The General Tire & Rubber Company, Akron, Ohio, a corporation of Ohio Application November 30, 1945, Serial No. 631,883

11 Claims. (Cl. 18—2)

This invention relates to tire bead spreaders particularly applicable to tires of large sizes and designed to facilitate the assembly with a tire casing of retread vulcanizing apparatus of the type employing a ring mold and an inflatable core.

The invention has for an object to provide a bead spreader which is so constructed and arranged that a retread ring mold and its associated core members may be conveniently assembled with the tire casing mounted in the spreader.

A further object of the invention is to provide a spreader which has means for supporting the ring mold in a position in which it can be conveniently placed upon a tire casing mounted in the spreader.

A further object of the invention is to provide a spreader which supports the tire casing with its beads spread apart and with the opening at one side of the casing unobstructed so that core members may be conveniently inserted in the tire casing.

It is also an object of the invention to provide a bead spreader that is applicable to tires of different sizes.

An additional object of the invention is to provide a bead spreader in which manually controlled fluid pressure operated means is employed for exerting a pull on the beads to spread the same.

With the above and other objects in view, the invention may be said to comprise the bead spreader as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a spreader embodying the invention;

Fig. 2 is a vertical section taken on the line indicated at 2—2 in Fig. 1;

Fig. 3 is a front elevation of the spreader;

Fig. 4 is a front elevation of one of the tire engaging discs;

Fig. 5 is a top plan view of the spreader, and

Figs. 6 and 7 are side and front elevations respectively of one of the bead engaging rings employed to engage the tire casing interiorly on the side opposite that engaged by the disc.

Referring to the accompanying drawings, the machine of the present invention is mounted upon a frame having a flat base 1 carrying a vertical front end plate 2. The top edge of the front plate 2 is formed on the arc of a circle of large radius and has a reinforcing member in the form of a tube 3 bent to arcuate form and attached to the top edge of the plate 2. The opposite ends of the tube 3 are vertically disposed and provide laterally spaced standards 4 and 5 at the front end of the frame.

The base 1 carries an elongated centrally disposed track or way which extends at right angles to the plane of the front plate 2. This track is composed of an inverted channel 6 attached to the base plate 1 and having angle bars 7 attached to its opposite sides. The angle bars 7 have outwardly projecting flanges 8 flush with the top of the channel 6 upon which a carriage 9 is mounted. The carriage 9 has pairs of rollers 10 and 11 at each of its four corners which engage with the upper and under sides of the flanges 8. The carriage 9 is of inverted U-shape and forms a housing for a fluid pressure cylinder 12 which is attached to the channel 6 by means of bolts 13. The cylinder 12 extends longitudinally of the channel 6 and has a piston 14 provided with a rod 15 that is attached to a cross plate 16 at the rear end of the carriage 9. Fluid under pressure applied to the front face of the piston 14 moves the carriage 9 rearwardly on the track and pressure applied to the rear face of the piston 14 moves the carriage forwardly. Operating pressure is applied to the cylinder 12 through pipes 17 and 18 that are connected to a valve 19 mounted on the standard 4 which is connected to a suitable source of air or other fluid under pressure by means of a pipe 20.

The carriage 9 carries a vertically disposed tubular standard 21 that is rigidly attached to the carriage and braced by means of triangular webs 22 and 23. The standard 21 supports an upper tubular section 24 attached to a tubular connecting member 25 that telescopes into the tubular sections of the standard and which is rigidly attached by suitable means such as pins 26 and 27 to the two sections. The upper and lower sections of the standard are spaced apart by the connecting member 25 and the portion of the connecting member 25 between the standard sections provides a bearing for a collar 28 which carries radial arms 29 having discs 30 attached to their outer ends by suitable means such as nuts 31.

A plurality of arms 29 are provided so that discs of different diameters may be mounted upon the arms for engagement with tire casings.

The discs 30 are readily detachable so that they can be quickly and easily replaced with discs of other sizes. The discs 30 are inserted into the opening in one side of a pneumatic tire casing and are of a diameter slightly greater than the internal bead diameter so that the beads of the tire casing can be engaged interiorly by peripheral portions of the disc. In order to facilitate the insertion of the discs into a tire casing, the discs are preferably provided with a flat segment 32 so that the discs will readily enter the tire casing when the casing is disposed at a small angle with respect to the discs.

The standard 21 carries at its upper end a horizontal forwardly extending arm 33 that is somewhat longer than the radial arms 29 and this arm provides a support for a suitable hoisting device for lifting a tire casing to a position where it can be engaged by one of the discs 30. The arm 33 carries a pulley 34 at its outer end and a pulley 35 at its inner end. A hoist cable 36 runs over the pulleys 34 and 35 under a movable pulley 37 and is attached to an I-bolt 38 attached to the under side of the arm 33. The pulley 37 is connected to the piston of a vertically disposed fluid pressure cylinder 39 that is attached to the standard 21. When the pulley 37 is pulled downwardly by actuation of the cylinder 39 the cable depending from the pulley 34 is moved upwardly. The cable 36 has a suitable hook 40 for engagement with a tire casing and is adapted to suspend the tire casing at the level of the rotatably mounted radial arms 29 so that one of the discs 30 can be inserted into the tire casing. The cable 36 and hook 40 permit the tire casing to be easily turned about a vertical axis and to be moved bodily toward or away from the standard 21 so that the operator may hold the casing in a position such that a disc 30 may be entered into the casing as it is swung outwardly to a position directly in front of the standard. The cylinder 39 is operated by fluid under pressure delivered to pipes 41 and 42 that extend to a manually operated control valve 43 mounted on the standard 21 and connected through a pipe 44 and a flexible hose 45 to a pressure pipe 46 mounted on the base 1.

The tubular front standards 4 and 5 have T-heads 47 at their upper ends in which are supported forwardly projecting horizontal shafts 48 upon which sleeves 49 are rotatably mounted. The sleeves 49 have tubular arms 50 rigidly attached thereto and braced by means of webs 51. A rod 52 is telescopically connected with each arm 50 and provides an adjustable extension for the arm, each of the rods 52 being held against turning movements in the tubular arm 50 by means of a pin 53 that slides in a longitudinal slot 54 in the tubular arm 50. At their outer ends each of the rods 52 has a hook 55 connected thereto by a pivot 56. The arms 50 are normally suspended in vertical position as shown in dotted lines in Fig. 1 and are adapted to be swung to a horizontal position in which the hooks 55 are disposed alongside diametrically opposite portions of a tire bead.

A ring 57 of a diameter slightly greater than the diameter of the opening in the side of the tire casing to be spread is employed for engaging the tire beads on the front side of the casing. Rings 57 of various diameters are provided to accommodate tires having openings of different diameters and each ring has a flattened or re-entrant segment 58 which facilitates the entry of the ring into the tire by turning the ring at an angle to the opening and inserting the ring edgewise into the casing. Each ring 57 is provided with outwardly projecting tabs 59 that are rigidly attached to diametrically opposite portions of the ring and which are adapted to project through the tire opening when the ring is positioned within the tire. The tabs 59 are provided with openings 60 to receive the hooks 55 carried by the pivoted arms on the standards 4 and 5.

When not in operation the carriage 9 is supported in its forward position and the arms 50 hang vertically in front of the standards 4 and 5. With the parts in this position the hook 40 is engaged with the tire casing on the floor in front of the machine and the valve 43 is operated to admit pressure to the cylinder 39, causing the tire to be hoisted to a position in which its axis is substantially at a level with the radial arms 29. With the tire suspended in this position it can be readily manipulated to place one of the discs 30 inside the tire casing, after which a ring 57 of the proper size is inserted in the opening at the front of the tire casing and engaged with the hooks 55 of the arms 50, as shown in Fig. 3. The hook 40 is then detached from the tire casing which is then supported by the disc 30 and ring 57. The valve 19 is then actuated to admit fluid under pressure to the cylinder 12 to move the carriage 9 and standard 21 rearwardly, causing the disc 30 to exert an inward pull on the inner tire bead of the tire casing to move the same inwardly away from the outer tire bead which is anchored by the ring 57.

The length of the radial arms 29 is such that there is room between the disc 30 and the standard 21 to hang a ring mold 61. When the beads of the casing have been spread apart the tread diameter of the casing will have been reduced sufficiently to permit the ring mold 61 to be placed over the periphery of the tire casing, to which a layer of retread stock has previously been applied.

As shown in Fig. 3, the outer opening of the tire casing is substantially unobstructed when the casing is supported in the spreader, so that an air bag 62 and an air bag supporting ring 63 can be readily inserted into the interior of the tire casing through the front opening thereof. After the ring mold and the core members, i. e. the air bag and supporting ring have been assembled with the tire casing, the pressure in the cylinder 12 may be relieved to allow the carriage to move forwardly and the inner bead of the tire casing to move forwardly toward the tire bead at the front side of the casing. As the tire beads move together the tire casing expands into the ring mold and the side walls of the casing move inwardly against the air bag.

After the pull on the tire casing is released the hooks 55 are disengaged from the ring 57 and the hook 40 again engaged with the outer bead of the tire casing, after which the ring 57 and the disc 30 are removed from the interior of the casing and the casing assembled with the vulcanizing mold elements may be readily transferred to the vulcanizing station.

It is to be understood that variations and modifications of the specific devices herein shown and described for purposes of illustration, may be made without departing from the spirit of the invention.

What I claim is:

1. A tire bead spreader for use in assembling tire casings with interior and exterior retread vulcanizing mold elements which comprises a pair of front supports spaced apart a distance greater than the bead diameter of a tire casing, a rear tire bead engaging member mounted rearwardly of said supports, a front tire bead engaging ring, means for connecting diametrically opposite portions of said ring to said supports so as to provide an unobstructed opening to the interior of the tire casing through said ring, and means for moving said rear bead engaging member rearwardly relative to said supports to spread the tire casing.

2. A tire spreader for use in assembling tire casings with interior and exterior retread vulcanizing mold elements which comprises a pair of front supports spaced apart a distance greater than the bead diameter of a tire casing, a rear tire supporting member having tire bead engaging means thereon, said supporting member having a portion upon which a ring mold may be supported and from which it may be moved over the tire bead engaging means onto the tire casing, a front tire bead engaging ring, means for connecting diametrically opposite portions of said ring to said supports so as to provide an unobstructed opening to the interior of the tire casing through said ring, and means for moving said rear bead engaging member rearwardly relative to said supports to spread the tire casing.

3. A tire bead spreader for use in assembling tire casings with interior and exterior retread vulcanizing mold elements which comprises a pair of laterally spaced front standards spaced apart a distance greater than the bead diameter of the tire casing, a standard mounted rearwardly of the front standards and movable forwardly and rearwardly relative to said front standards, a rear tire bead engaging annulus, a front tire bead engaging ring, means for connecting said annulus to the rear standard and for supporting a ring mold between the annulus and standard, means connecting diametrically opposite portions of said ring to said front standards to provide an unobstructed opening through the ring to the interior of the tire casing, and means for shifting the rear standard relative to the front standards to spread the beads of a tire casing and to support the casing in a position to facilitate the mounting of the ring mold on the tire tread and the insertion of core members through said ring into the interior of the mold.

4. A tire bead spreader for use in assembling tire casings with interior and exterior retread vulcanizing mold elements which comprises a pair of laterally spaced front standards spaced apart a distance greater than the bead diameter of the tire casing, a standard mounted rearwardly of the front standards and movable forwardly and rearwardly relative to said front standards, an arm attached to said rear standard of a length to receive a retread ring mold and to support the same alongside the standard, a disc attached to the outer end of said arm for interiorly engaging a tire bead, a ring for interiorly engaging the opposite bead of a tire, means connecting diametrically opposite portions of said ring to said front standards so as to provide an unobstructed front opening to the interior of the casing through said ring, and means for shifting said rear standard relative to said front standards to spread the tire beads.

5. A tire bead spreader comprising a pair of laterally spaced stationary standards, a carriage mounted for horizontal linear travel in a direction at right angles to a line connecting said standards, a standard fixed to said carriage, two annuli adapted to be inserted in a tire casing and engageable with the interior of the casing along the margins of the bead openings, means connecting one of said annuli to the stationary standards and the other annuli to the movable standard, and means for actuating said carriage to spread a tire casing.

6. A tire bead spreader comprising a pair of laterally spaced stationary standards, a carriage mounted for horizontal linear travel in a direction at right angles to a line connecting said standards, a standard fixed to said carriage, two annuli adapted to be inserted in a tire casing and engageable with the interior of the casing along the margins of the bead openings, means connecting one of said annuli to the stationary standards and the other annuli to the movable standard, and a fluid pressure cylinder connected to said carriage to actuate the same.

7. A tire bead spreader comprising a frame having a base provided with a longitudinal way and a pair of laterally spaced stationary standards carried by said base at one end, a carriage mounted to travel on said way, a standard fixed to said carriage, a pair of annuli engageable interiorly with opposite bead portions of a tire, means for connecting one of said annuli to said stationary standards and the other of said annuli to the movable standard, and a fluid pressure cylinder on said base for actuating said carriage.

8. A tire bead spreader comprising a frame having a base provided with a longitudinal way and a pair of laterally spaced stationary standards carried by said base at one end, a carriage mounted to travel on said way, a movable standard on said carriage, a horizontal arm on said movable standard, a disc carried by said arm for engagement interiorly with one side of a tire casing, a ring engageable interiorly with the opposite side of a tire casing, means for connecting said ring to the stationary standards, and a fluid pressure cylinder for actuating said carriage.

9. A tire bead spreader comprising a pair of laterally spaced stationary standards, a carriage mounted for linear travel at right angles to a line connecting said standards, a movable standard on said carriage disposed centrally with respect to the fixed standards, a collar rotatably mounted on said standard, a radial arm carried by said collar, a disc detachably connected to said arm and engageable interiorly with one side of a tire casing, a ring engageable interiorly with the opposite side of a tire casing and having diametrically opposite portions adapted to project through the side opening of the tire casing, means including hooks engageable with said projecting portions for connecting said ring to said stationary standards, and a fluid pressure cylinder for actuating said carriage.

10. A tire bead spreader comprising a pair of laterally spaced stationary standards, a carriage mounted for linear travel at right angles to a line connecting said standards, a movable standard on said carriage disposed centrally with respect to the fixed standards, a collar rotatably mounted on said standard, a radial arm carried by said collar, a disc detachably connected to said arm and engageable interiorly with one side of a tire casing, a ring engageable interiorly with the opposite side of a tire casing and having diametrically opposite portions adapted to project through the side opening of the tire casing, an arm pivoted to each stationary standard and movable to a horizontal position in the space between the standards, hooks carried by said arms for engagement with the projecting portions of said ring, and means for actuating said carriage to spread a tire casing engaged by said disc and ring.

11. A tire bead spreader comprising a pair of laterally spaced front standards, each having a forwardly extending horizontal shaft attached thereto, an extensible arm pivoted on each shaft, a hook carried by the free end of each of said arms, a ring for engagement interiorly with a tire bead and having diametrically opposite projecting tabs for engagement with said hooks, means spaced rearwardly with respect to said standards for interiorly engaging the tire bead opposite that engaged by the ring, and means for shifting said engaging means rearwardly relative to said standards to spread the tire casing.

HERMAN T. KRAFT.

REFERENCES CITED

The following references are of record in the file of this patent:

UNITED STATES PATENTS

| Number | Name | Date |
| --- | --- | --- |
| 1,288,733 | Stevens | Dec. 24, 1918 |
| 2,244,162 | Leguillon | June 3, 1941 |
| 2,259,975 | Hewel | Oct. 21, 1941 |
| 2,310,891 | Branick | Feb. 9, 1943 |
| 2,353,570 | Kraft | July 11, 1944 |